(12) United States Patent
Zhu et al.

(10) Patent No.: US 10,064,134 B2
(45) Date of Patent: Aug. 28, 2018

(54) SYSTEM INFORMATION PROCESSING METHOD AND APPARATUS, AND COMMUNICATIONS SYSTEM

(71) Applicant: Huawei Technologies Co., Ltd., Shenzhen (CN)

(72) Inventors: Song Zhu, Beijing (CN); Xiaolong Guo, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 246 days.

(21) Appl. No.: 15/197,217

(22) Filed: Jun. 29, 2016

(65) Prior Publication Data
US 2016/0316431 A1 Oct. 27, 2016

Related U.S. Application Data

(63) Continuation of application No. PCT/CN2013/091083, filed on Dec. 31, 2013.

(51) Int. Cl.
*G08C 17/00* (2006.01)
*H04W 52/02* (2009.01)
(Continued)

(52) U.S. Cl.
CPC ....... *H04W 52/0216* (2013.01); *H04W 24/02* (2013.01); *H04W 48/10* (2013.01);
(Continued)

(58) Field of Classification Search
None
See application file for complete search history.

(56) References Cited

U.S. PATENT DOCUMENTS 6,708,221 B1 * 3/2004 Mendez .................. G06F 9/54
709/204
2009/0239554 A1 9/2009 Sammour et al.
(Continued)

FOREIGN PATENT DOCUMENTS

CN 101043671 A 9/2007
CN 101212799 7/2008
(Continued)

OTHER PUBLICATIONS

Global System for Mobile Communications, "3rd Generation Partnership Project; Technical Specification Group GSM/EDGE Radio Access Network; Mobile Radio Interface layer 3 specification; Radio Resource Control (RRC) protocol," Release 12, 3GPP TS 44.018, V12.1.0, Nov. 2013, 467 pages.
(Continued)

*Primary Examiner* — Kenny S Lin
(74) *Attorney, Agent, or Firm* — Slater Matsil, LLP

(57) ABSTRACT

Embodiments of the present invention provide a system information processing method. The method in the present invention includes: receiving a first synchronization signal; and identifying whether configuration information of the first synchronization signal is configured as an indication for a system information change; and if it is identified that the configuration information of the first synchronization signal is configured as the indication for a system information change, receiving broadcast system information; and updating a mapping relationship between a current synchronization signal and the system information according to the first synchronization signal and the received broadcast system information. The embodiments of the present invention may effectively reduce power consumption of UE and implement that the UE may quickly learn that the system information changes in a case of low power consumption.

19 Claims, 4 Drawing Sheets

(51) Int. Cl.
*H04W 56/00* (2009.01)
*H04W 24/02* (2009.01)
*H04W 48/10* (2009.01)
*H04W 48/12* (2009.01)
*H04W 48/16* (2009.01)

(52) U.S. Cl.
CPC ....... *H04W 48/12* (2013.01); *H04W 52/0229* (2013.01); *H04W 56/00* (2013.01); *H04W 56/001* (2013.01); *H04W 48/16* (2013.01); *Y02D 70/00* (2018.01); *Y02D 70/1262* (2018.01)

(56) References Cited

U.S. PATENT DOCUMENTS

| | | | | |
|---|---|---|---|---|
| 2010/0145908 | A1* | 6/2010 | Freedman | G06F 17/30575 707/610 |
| 2011/0103506 | A1* | 5/2011 | Moon | H04L 5/0023 375/267 |
| 2011/0223915 | A1* | 9/2011 | Kwack | H04W 48/12 455/436 |
| 2013/0051325 | A1* | 2/2013 | Ryu | H04W 74/0833 370/328 |
| 2013/0308586 | A1 | 11/2013 | Yamada et al. | |
| 2014/0179324 | A1 | 6/2014 | Lee | |
| 2014/0269409 | A1* | 9/2014 | Dimou | B23K 10/003 370/254 |

FOREIGN PATENT DOCUMENTS

| | | |
|---|---|---|
| CN | 101873694 A | 10/2010 |
| CN | 101877825 A | 11/2010 |
| JP | 2011519497 A | 7/2011 |
| JP | 2012075137 A | 4/2012 |
| JP | 2012512591 A | 5/2012 |
| JP | 2012244585 A | 12/2012 |
| WO | 2009132674 A1 | 11/2009 |
| WO | 2011046386 A2 | 4/2011 |
| WO | 2011098593 A1 | 8/2011 |
| WO | 2012147049 A1 | 11/2012 |

OTHER PUBLICATIONS

Huawei, et al., "Introduction of EAB in 36.331," 3GPP TSG-RAN WG2 Meeting #79, R2-124344, Qingdao, P.R. China, Aug. 13-17, 2012, 16 pages.

* cited by examiner

SYSTEM INFORMATION PROCESSING METHOD AND APPARATUS, AND COMMUNICATIONS SYSTEM

CROSS-REFERENCE TO RELATED APPLICATIONS

This application is a continuation of International Application No. PCT/CN2013/091083, filed on Dec. 31, 2013, which is hereby incorporated by reference in its entirety.

TECHNICAL FIELD

Embodiments of the present invention relate to the field of communications technologies, and in particular, to a system information processing method and apparatus, and a communications system.

BACKGROUND

In a Long Term Evolution (LTE) network, a user equipment (UE) accesses the network, the UE needs to receive multiple different types of system messages multiple times, such as multiple types of system information block (SIB) information. This process takes a relatively long time, and there is also much access information. If a piece of SIB information changes, all UEs need to be instructed in time to re-acquire SIB information.

Currently, a mainly used manner in which all UEs are instructed to re-acquire SIB information is: configuring a 5-bit systemlnfoValueTag in the SIB information, where the systemlnfoValueTag is used to indicate whether the SIB information changes. However, because the 5-bit systemInfoValueTag configured in the SIB information can be acquired only after the entire SIB information is received, a problem of a relatively long notification time is caused, which therefore causes an increase in power consumption of the UE.

SUMMARY

Embodiments of the present invention provide a system information processing method and apparatus, and a communications system, which can implement that it is not required to learn, only after system information is received, that the system information changes, so that power consumption of UE is effectively reduced, and it is implemented that the UE can quickly learn a system information change in a case of low power consumption.

According to a first aspect, an embodiment of the present invention provides a system information processing method, including: receiving a first synchronization signal; and identifying whether configuration information of the first synchronization signal is configured as an indication for a system information change; and if it is identified that the configuration information of the first synchronization signal is configured as the indication for a system information change, receiving broadcast system information, and updating a mapping relationship between a current synchronization signal and the system information according to the first synchronization signal and the received broadcast system information.

In a first possible implementation manner of the first aspect, the identifying whether configuration information of the first synchronization signal is configured as an indication for a system information change; and if it is identified that the configuration information of the first synchronization signal is configured as the indication for a system information change, receiving broadcast system information, and updating a mapping relationship between a current synchronization signal and the system information according to the first synchronization signal and the received broadcast system information includes: comparing the configuration information of the first synchronization signal with configuration information of a synchronization signal in the mapping relationship between the current synchronization signal and the system information. If the configuration information of the first synchronization signal is different from the configuration information of the synchronization signal in the mapping relationship between the current synchronization signal and the system information, receiving broadcast first system information and storing a mapping relationship between the first synchronization signal and the first system information in the mapping relationship between the synchronization signal and the system information.

With reference to the first possible implementation manner of the first aspect, in a second possible implementation manner of the first aspect, if the first system information includes a second synchronization signal, and configuration information of the second synchronization signal is configured as an indication that preset broadcast information starts, acquiring the preset broadcast information, and saving the preset broadcast information.

With reference to the first aspect, in a third possible implementation manner of the first aspect, before the receiving a first synchronization signal, the method further includes: receiving and saving a third synchronization signal; and receiving broadcast third system information, and establishing the mapping relationship between the current synchronization signal and the system information according to the third synchronization signal and the third system information.

With reference to the third possible implementation manner of the first aspect, in a fourth possible implementation manner of the first aspect, the third synchronization signal includes N groups of configuration information, the third system information includes N parts of system information, and the $i^{th}$ group of configuration information corresponds to the $i^{th}$ part of system information and is used to indicate whether the $i^{th}$ part of system information changes, where both i and N are positive integers, and i is less than or equal to N.

With reference to the fourth possible implementation manner of the first aspect, in a fifth possible implementation manner of the first aspect, the identifying whether configuration information of the first synchronization signal is configured as an indication for a system information change; and if it is identified that the configuration information of the first synchronization signal is configured as the indication for a system information change, receiving broadcast system information, and updating a mapping relationship between a current synchronization signal and the system information according to the first synchronization signal and the received broadcast system information includes identifying whether the configuration information of the first synchronization signal is configured as the indication for a system information change; and if it is identified that the $i^{th}$ group of configuration information of the first synchronization signal is configured as an indication for a change of the $i^{th}$ part of system information of the first system information, receiving the $i^{th}$ part of broadcast system information, and updating the first synchronization signal and the first system information in the mapping relationship between the current synchronization signal and the system information according to the $i^{th}$ group of configuration information and the $i^{th}$ part of system information.

With reference to the fourth possible implementation manner of the first aspect, in a sixth possible implementation manner of the first aspect, the third system information includes a synchronization signal parameter; and the receiving a first synchronization signal includes receiving, according to the synchronization signal parameter, the first synchronization signal matched with the synchronization signal parameter.

With reference to the first aspect or any one of the first to sixth possible implementation manners of the first aspect, in a seventh possible implementation manner of the first aspect, the configuration information of the first synchronization signal, the configuration information of the second synchronization signal, and/or the configuration information of the second synchronization signal include: different synchronize sequences, different shifts of a synchronize sequence, a preset time-frequency position of a synchronize sequence, the different synchronize sequences and the preset time-frequency position of the synchronize sequence, or the different shifts of the synchronize sequence and the preset time-frequency position of the synchronize sequence.

According to a second aspect, an embodiment of the present invention provides a system information processing method, including: performing change processing on configuration information of a broadcast synchronization signal when system information changes; and broadcasting changed system information and a first synchronization signal generated after the change processing, so that UE identifies, after receiving the first synchronization signal, whether configuration information of the first synchronization signal is configured as an indication for a system information change; and if it is identified that the configuration information of the first synchronization signal is configured as the indication for a system information change, receives the broadcast changed system information, and updates a mapping relationship between a current synchronization signal and the system information according to the first synchronization signal and the broadcast changed system information.

In a first possible implementation manner of the second aspect, the first system information includes a second synchronization signal, and configuration information of the second synchronization signal is configured as an indication that preset broadcast information starts, so that after receiving the broadcast first system information, the UE acquires the preset broadcast information, and saves the preset broadcast information.

With reference to the second aspect or the first possible implementation manner of the second aspect, in a second possible implementation manner of the second aspect, the method further includes: broadcasting a third synchronization signal; and broadcasting third system information, so that after receiving the third synchronization signal and the third system information, the UE establishes the mapping relationship between the current synchronization signal and the system information.

With reference to the second possible implementation manner of the second aspect, in a third possible implementation manner of the second aspect, the method further includes: dividing configuration information of a synchronization signal in the mapping relationship between the current synchronization signal and the system information into N groups, and dividing system information corresponding to the synchronization signal into N groups, so that the $i^{th}$ group of configuration information corresponds to the $i^{th}$ part of system information and is used to indicate whether the $i^{th}$ part of system information changes; where the performing change processing on configuration information of a broadcast synchronization signal when system information changes includes performing change processing on the $i^{th}$ group of configuration information of the broadcast synchronization signal when the $i^{th}$ part of system information of the system information changes, where both i and N are positive integers, and i is less than or equal to N.

With reference to the second possible implementation manner of the second aspect, in a fourth possible implementation manner of the second aspect, the third system information includes: a synchronization signal parameter, so that the UE receives, according to the synchronization signal parameter, the first synchronization signal matched with the synchronization signal parameter.

With reference to the second aspect or any one of the first to fourth possible implementation manners of the second aspect, in a fifth possible implementation manner of the second aspect, the configuration information of the first synchronization signal, the configuration information of the second synchronization signal, and/or configuration information of the third synchronization signal include: different synchronize sequences, different shifts of a synchronize sequence, a preset time-frequency position of a synchronize sequence, the different synchronize sequences and the preset time-frequency position of the synchronize sequence, or the different shifts of the synchronize sequence and the preset time-frequency position of the synchronize sequence.

According to a third aspect, an embodiment of the present invention provides a system information processing apparatus, including: a receiving module, configured to receive a first synchronization signal; an identifying module, configured to identify whether configuration information of the first synchronization signal is configured as an indication for a system information change; where the receiving module is further configured to: if the identifying module identifies that the configuration information of the first synchronization signal is configured as the indication for a system information change, receive broadcast system information; and an updating module, configured to update a mapping relationship between a current synchronization signal and the system information according to the first synchronization signal and the received broadcast system information.

In a first possible implementation manner of the third aspect, the identifying module is specifically configured to compare the configuration information of the first synchronization signal with configuration information of a synchronization signal in the mapping relationship between the current synchronization signal and the system information, and if the configuration information of the first synchronization signal is different from the configuration information of the synchronization signal in the mapping relationship between the current synchronization signal and the system information, the receiving module receives broadcast first system information; and the updating module is specifically configured to store a mapping relationship between the first synchronization signal and the first system information in the mapping relationship between the synchronization signal and the system information.

With reference to the first possible implementation manner of the third aspect, in a second possible implementation manner of the third aspect, if the first system information includes a second synchronization signal, and configuration information of the second synchronization signal is configured as an indication that preset broadcast information starts, the receiving module is further configured to acquire the preset broadcast information; and the apparatus further includes: a saving module, configured to save the preset broadcast information.

With reference to the third aspect, in a third possible implementation manner of the third aspect, the receiving module is further configured to receive a third synchronization signal; and the apparatus further includes: a saving module, configured to save the third synchronization signal; where the receiving module is further configured to receive broadcast third system information; and the saving module is further configured to establish the mapping relationship between the current synchronization signal and the system information according to the third synchronization signal and the third system information.

With reference to the third possible implementation manner of the third aspect, in a fourth possible implementation manner of the third aspect, when the third synchronization signal includes N groups of configuration information, the third system information includes N parts of system information, and the $i^{th}$ group of configuration information corresponds to the $i^{th}$ part of system information and is used to indicate whether the $i^{th}$ part of system information changes, the identifying module is specifically configured to identify whether the first synchronization signal is configured as an indication for a system information change; and if it is identified that the $i^{th}$ group of configuration information of the first synchronization signal is configured as an indication for a change of the $i^{th}$ part of system information of the first system information, the receiving module receives the $i^{th}$ part of broadcast system information; and the updating module is specifically configured to update the first synchronization signal and the first system information in the mapping relationship between the current synchronization signal and the system information according to the $i^{th}$ group of configuration information and the $i^{th}$ part of system information; where both i and N are positive integers, and i is less than or equal to N.

With reference to the third possible implementation manner of the third aspect, in a fifth possible implementation manner of the third aspect, the third system information includes a synchronization signal parameter; and the receiving module is specifically configured to receive, according to the synchronization signal parameter, the first synchronization signal matched with the synchronization signal parameter.

According to a fourth aspect, an embodiment of the present invention provides a system information processing apparatus, including: a change processing module, configured to perform change processing on configuration information of a broadcast synchronization signal when system information changes; and a broadcasting module, configured to broadcast changed system information and a first synchronization signal generated after the change processing, so that UE identifies, after receiving the first synchronization signal, whether configuration information of the first synchronization signal is configured as an indication for a system information change; and if it is identified that the first synchronization signal is configured as the indication for a system information change, receives the broadcast changed system information, and updates a mapping relationship between a current synchronization signal and the system information according to the first synchronization signal and the broadcast changed system information.

In a first possible implementation manner of the fourth aspect, the broadcasting module is further configured to broadcast the first system information, where the first system information includes a second synchronization signal, and configuration information of the second synchronization signal is configured as an indication that preset broadcast information starts, so that after receiving the broadcast first system information, the UE acquires the preset broadcast information, and saves the preset broadcast information.

With reference to the fourth aspect or the first possible implementation manner of the fourth aspect, in a second possible implementation manner of the fourth aspect, the broadcasting module is further configured to broadcast a third synchronization signal; and broadcast third system information, so that after receiving the third synchronization signal and the third system information, the UE establishes the mapping relationship between the current synchronization signal and the system information.

With reference to the second possible implementation manner of the fourth aspect, in a third possible implementation manner of the fourth aspect, the apparatus further includes: a grouping module, configured to divide configuration information of a synchronization signal in the mapping relationship between the current synchronization signal and the system information into N groups, and divide system information corresponding to the synchronization signal into N groups, so that the $i^{th}$ group of configuration information corresponds to the $i^{th}$ part of system information and is used to indicate whether the $i^{th}$ part of system information changes; where the change processing module is specifically configured to perform change processing on the $i^{th}$ group of configuration information of the broadcast synchronization signal when the $i^{th}$ part of system information of the system information changes, where both i and N are positive integers, and i is less than or equal to N.

With reference to the second possible implementation manner of the fourth aspect, in a fourth possible implementation manner of the fourth aspect, the third system information broadcast by the broadcasting module includes: a synchronization signal parameter, so that the UE receives, according to the synchronization signal parameter, the first synchronization signal matched with the synchronization signal parameter.

According to a fifth aspect, an embodiment of the present invention provides a communications system, including: user equipment and a network side device, where the user equipment is the system information processing apparatus according to the foregoing third aspect, and the network side device is the system information processing apparatus according to the foregoing fourth aspect.

According to the system information processing method and apparatus, and the communications system in the embodiments the present invention, a first synchronization signal is received; and if it is identified that configuration information of the first synchronization signal is configured as an indication for a system information change, broadcast system information is received, and a mapping relationship between a current synchronization signal and the system information is updated according to the first synchronization signal and the received broadcast system information. Compared with a relatively long notification time and an increase in power consumption of UE that are caused by a 5-bit systemlnfoValueTag configured in SIB information in the prior art, in the present invention, it is not required to learn, only after the system information is received, that the system information changes, so that power consumption of the UE is effectively reduced, and it is implemented that the UE can quickly learn the system information change in a case of low power consumption.

BRIEF DESCRIPTION OF THE DRAWINGS

To describe the technical solutions in the embodiments of the present invention more clearly, the following briefly introduces the accompanying drawings required for describing the embodiments or the prior art. Apparently, the accompanying drawings in the following description show some embodiments of the present invention, and persons of ordinary skill in the art may still derive other drawings from these accompanying drawings without creative efforts.

DETAILED DESCRIPTION OF ILLUSTRATIVE EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

Figure 1:
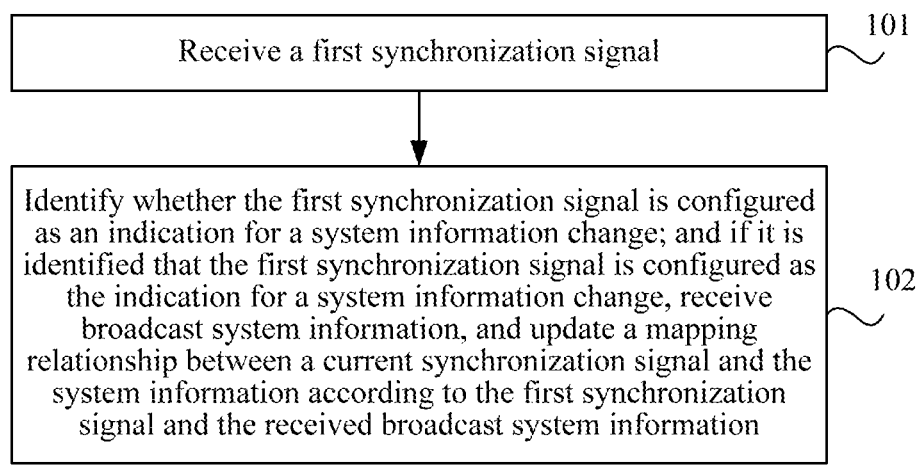
FIG. 1 is a flowchart of an embodiment of a system information processing method according to the present invention.

FIG. 1 is a flowchart of an embodiment of a system information processing method according to the present invention. As shown in FIG. 1, this embodiment is executed by user equipment, and the method may include:

Step 101: Receive a first synchronization signal.

Step 102: Identify whether configuration information of the first synchronization signal is configured as an indication for a system information change; and if it is identified that the configuration information configured of the first synchronization signal is configured as the indication for a system information change, receive broadcast system information, and update a mapping relationship between a current synchronization signal and the system information according to the first synchronization signal and the received broadcast system information.

In this embodiment, when the UE re-accesses a network, the UE first receives the first synchronization signal broadcast by a network side device, where the first synchronization signal is used to indicate whether the system information changes.

In addition, in this embodiment, optionally, the configuration information of the first synchronization signal includes: different synchronize sequences, different shifts of a synchronize sequence, a preset time-frequency position of a synchronize sequence, the different synchronize sequences and the preset time-frequency position of the synchronize sequence, or the different shifts of the synchronize sequence and the preset time-frequency position of the synchronize sequence.

In this embodiment, it should be noted that, if the first synchronization signal is not configured as the indication for a system information change, the mapping relationship between the current synchronization signal and the system information is queried, system information corresponding to the first synchronization signal is acquired, and the network is accessed according to the system information.

In this embodiment, a first synchronization signal is received; if it is identified that configuration information of the first synchronization signal is configured as an indication for a system information change, broadcast system information is received, and a mapping relationship between a current synchronization signal and the system information is updated according to the first synchronization signal and the received broadcast system information. Compared with a relatively long notification time and an increase in power consumption of UE that are caused by a 5-bit systemInfoValueTag configured in SIB information in the prior art, in the present invention, it is not required to learn, only after the system information is received, that the system information changes, so that power consumption of the UE is effectively reduced, and it is implemented that the UE can quickly learn the system information change in a case of low power consumption.

Figure 2:
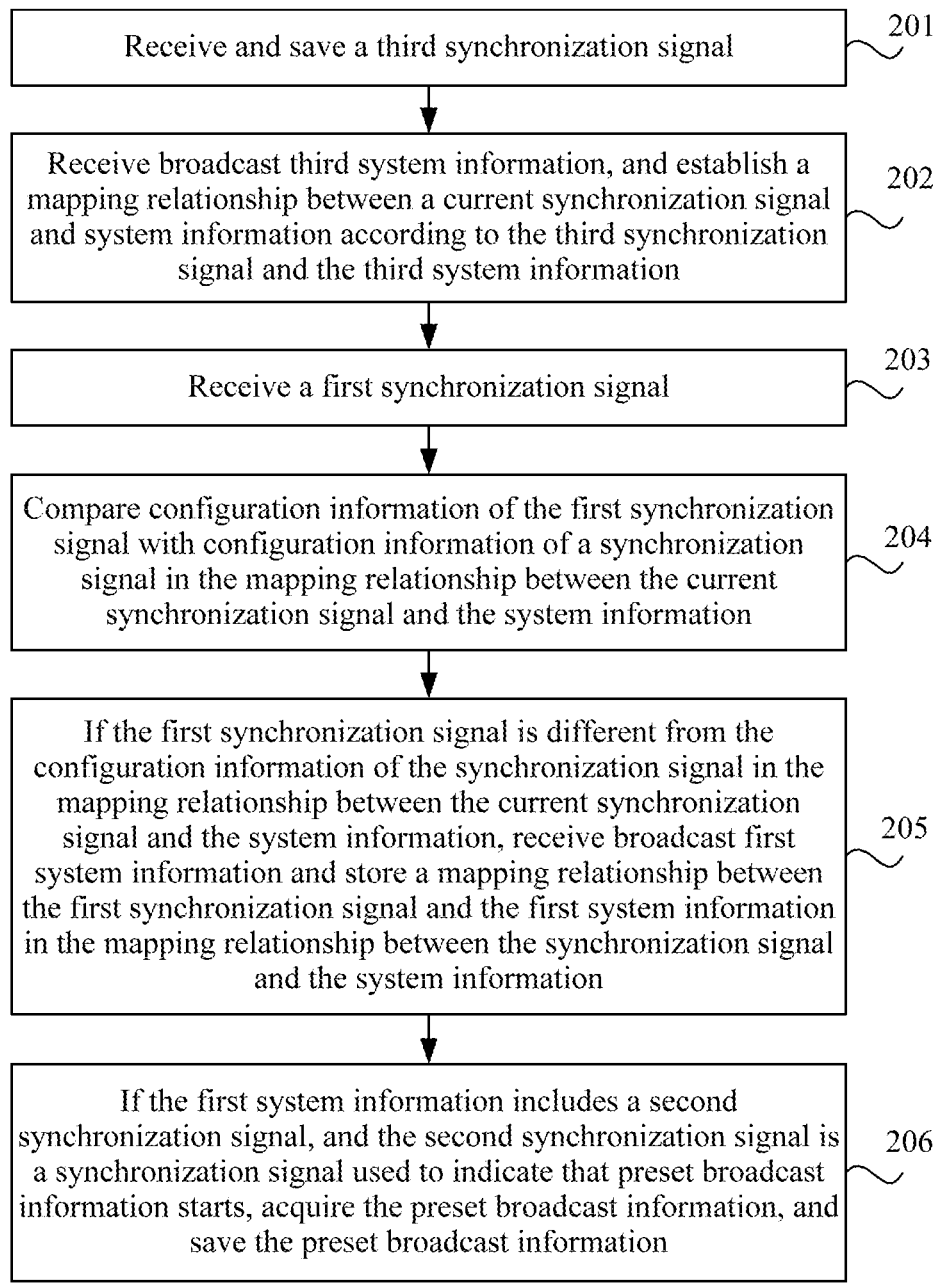
FIG. 2 is a flowchart of another embodiment of a system information processing method according to the present invention.

FIG. 2 is a flowchart of another embodiment of a system information processing method according to the present invention. As shown in FIG. 2, this embodiment is executed by user equipment, and the method may include:

Step 201: Receive and save a third synchronization signal.

Step 202: Receive broadcast third system information, and establish a mapping relationship between a current synchronization signal and system information according to the third synchronization signal and the third system information.

In this embodiment, when the UE initially accesses a network, the UE may first receive the third synchronization signal broadcast by a network side device, to implement synchronization with the network side device, and save the third synchronization signal. Then, the UE receives the third system information broadcast by the network side device, and establishes the mapping relationship between the current synchronization signal and the system information according to the third synchronization signal and the third system information.

In addition, in this embodiment, optionally, configuration information of the third synchronization signal includes: different synchronize sequences, different shifts of a synchronize sequence, a preset time-frequency position of a synchronize sequence, the different synchronize sequences and the preset time-frequency position of the synchronize sequence, or the different shifts of the synchronize sequence and the preset time-frequency position of the synchronize sequence.

Step 203: Receive a first synchronization signal.

Step 204: Compare configuration information of the first synchronization signal with configuration information of a synchronization signal in the mapping relationship between the current synchronization signal and the system information.

Step 205: If the first synchronization signal is different from the configuration information of the synchronization signal in the mapping relationship between the current synchronization signal and the system information, receive broadcast first system information and store a mapping relationship between the first synchronization signal and the first system information in the mapping relationship between the synchronization signal and the system information.

Step 206: If the first system information includes a second synchronization signal, and the second synchronization signal is a synchronization signal used to indicate that preset broadcast information starts, acquire the preset broadcast information, and save the preset broadcast information.

In this embodiment, optionally, configuration information of the second synchronization signal includes: different synchronize sequences, different shifts of a synchronize sequence, a preset time-frequency position of a synchronize sequence, the different synchronize sequences and the preset time-frequency position of the synchronize sequence, or the different shifts of the synchronize sequence and the preset time-frequency position of the synchronize sequence.

Figure 3:
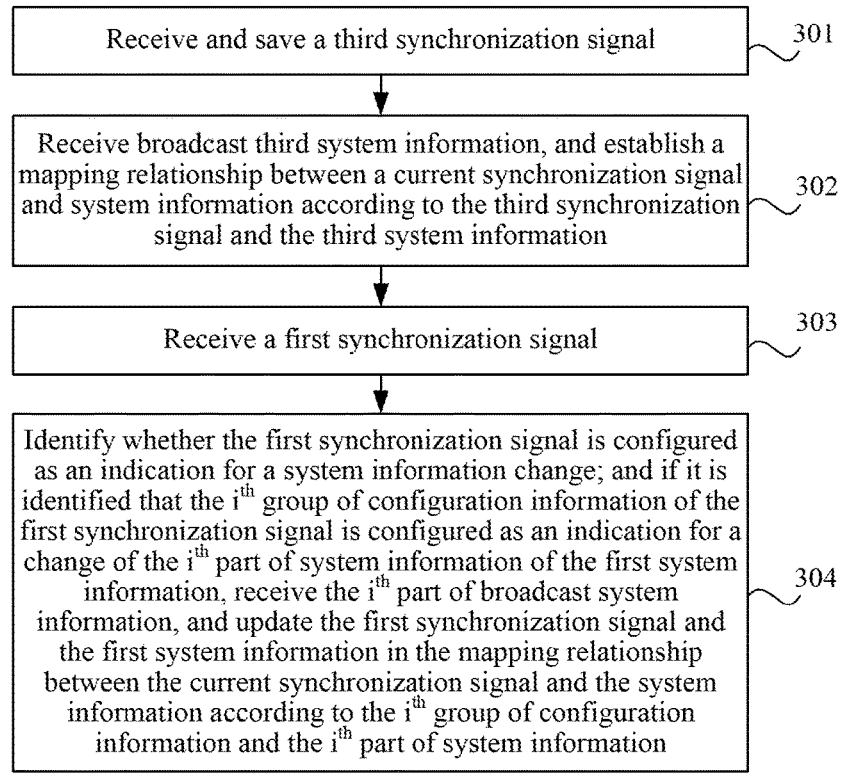
FIG. 3 is a flowchart of still another embodiment of a system information processing method according to the present invention.

FIG. 3 is a flowchart of still another embodiment of a system information processing method according to the present invention. As shown in FIG. 3, this embodiment is executed by user equipment, and the method may include:

Step 301: Receive and save a third synchronization signal.

Step 302: Receive broadcast third system information, and establish a mapping relationship between a current synchronization signal and system information according to the third synchronization signal and the third system information.

In this embodiment, when the UE initially accesses a network, the UE may first receive a third synchronization signal broadcast by a network side device, to implement synchronization with the network side device, and save the third synchronization signal. Then, the UE receives the third system information broadcast by the network side, and establishes the mapping relationship between the current synchronization signal and the system information according to the third synchronization signal and the third system information.

In addition, in this embodiment, optionally, configuration information of the third synchronization signal includes: different synchronize sequences, different shifts of a synchronize sequence, a preset time-frequency position of a synchronize sequence, the different synchronize sequences and the preset time-frequency position of the synchronize sequence, or the different shifts of the synchronize sequence and the preset time-frequency position of the synchronize sequence.

It should further be noted that, the third synchronization signal includes N groups of configuration information, the third system information includes N parts of system information, and the $i^{th}$ group of configuration information corresponds to the $i^{th}$ part of system information and is used to indicate whether the $i^{th}$ part of system information changes, where both i and N are positive integers, and i is less than or equal to N.

Step 303: Receive a first synchronization signal.

In this embodiment, optionally, the network side device may preconfigure synchronization signals as indications for changes of different pieces of system information. For example, the first synchronization signal may be used to be configured as an indication for a change of first system information, or may be configured as an indication for a change of second system information, or may be configured as an indication for a change of other system information.

Step 304: Identify whether the first synchronization signal is configured as an indication for a system information change; and if it is identified that the $i^{th}$ group of configuration information of the first synchronization signal is configured as an indication for a change of the $i^{th}$ part of system information of first system information, receive the $i^{th}$ part of broadcast system information, and update the first synchronization signal and the first system information in the mapping relationship between the current synchronization signal and the system information according to the $i^{th}$ group of configuration information and the $i^{th}$ part of system information.

In this embodiment, for example, when the first configuration information is configured as an indication for a change of the first part of system information in the first system information, only the first part of system information in the first system information is received; when the fifth configuration information is configured as an indication for a change of the fifth part of system information in the first system information, only the fifth part of system information is received, thereby effectively improving an accessing capability of the user equipment.

Further, in still another embodiment of the present invention, based on either one of the embodiments shown in FIG. 2 and FIG. 3, the third system information includes a synchronization signal parameter, and a specific implementation manner of the receiving a first synchronization signal is:

receiving, according to the synchronization signal parameter, the first synchronization signal matched with the synchronization signal parameter.

In this embodiment, the synchronization signal parameter may be used to indicate a synchronization signal that can be used in a current cell, and when the user equipment re-accesses the network, the user equipment can receive the synchronization signal according to the stored synchronization signal parameter.

Figure 4:
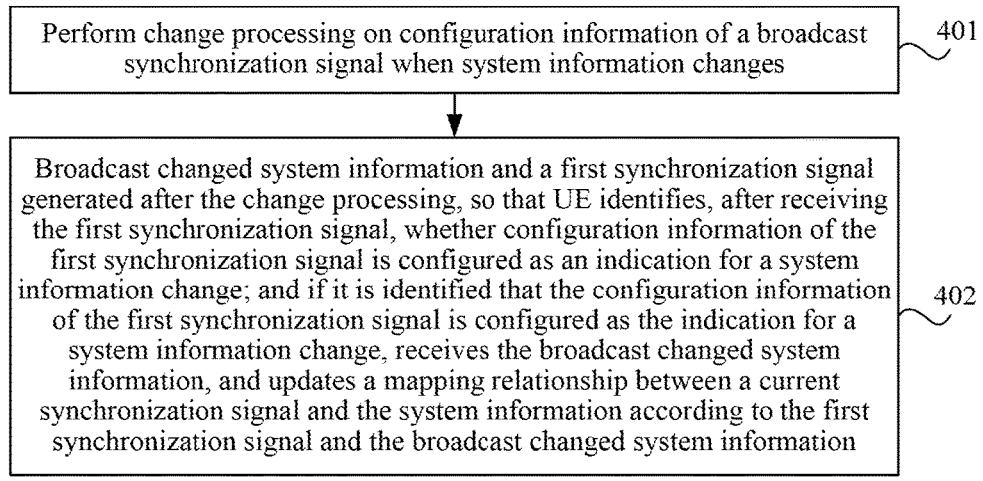
FIG. 4 is a flowchart of yet another embodiment of a system information processing method according to the present invention.

FIG. 4 is a flowchart of yet another embodiment of a system information processing method according to the present invention. As shown in FIG. 4, this embodiment is executed by a network side device, and the method includes:

Step 401: Perform change processing on configuration information of a broadcast synchronization signal when system information changes.

Step 402: Broadcast changed system information and a first synchronization signal generated after the change processing, so that UE identifies, after receiving the first synchronization signal, whether configuration information of the first synchronization signal is configured as an indication for a system information change; and if it is identified that the configuration information of the first synchronization signal is configured as the indication for a system information change, receives the broadcast changed system information, and updates a mapping relationship between a current synchronization signal and the system information according to the first synchronization signal and the broadcast changed system information.

The UE in this embodiment may perform the technical solutions in any one of the method embodiments shown in FIG. 1 to FIG. 3. Implementation principles thereof are similar, and details are not described herein again.

In this embodiment, change processing is performed on configuration information of a broadcast synchronization signal when system information changes; changed system information and a first synchronization signal generated after the change processing are broadcast, so that UE identifies, after receiving the first synchronization signal, whether configuration information of the first synchronization signal is configured as an indication for a system information change; and if it is identified that the configuration information of the first synchronization signal is configured as the indication for a system information change, receives the broadcast changed system information, and updates a mapping relationship between a current synchronization signal and the system information according to the first synchronization signal and the broadcast changed system information. Compared with a relatively long notification time and an increase in power consumption of UE that are caused by a 5-bit systemlnfoValueTag configured in SIB information in the prior art, in the present invention, it is not required to learn, only after the system information is received, that the system information changes, so that power consumption of the UE is effectively reduced, and it is implemented that the UE can quickly learn the system information change in a case of low power consumption.

Further, in another embodiment of the present invention, based on the embodiment shown in FIG. 4, the first system information includes a second synchronization signal, and configuration information of the second synchronization signal is configured as an indication that preset broadcast information starts, so that after receiving the broadcast first system information, the UE acquires the preset broadcast information, and saves the preset broadcast information.

Optionally, before step 401, the method may further include: broadcasting a third synchronization signal; and broadcasting third system information, so that after receiving the third synchronization signal and the third system information, the UE establishes the mapping relationship between the current synchronization signal and the system information.

Optionally, the method may further include: dividing configuration information of a synchronization signal in the mapping relationship between the current synchronization signal and the system information into N groups, and dividing system information corresponding to the synchronization signal into N groups, so that the $i^{th}$ group of configuration information corresponds to the $i^{th}$ part of system information and is used to indicate whether the $i^{th}$ part of system information changes; where step 401 is specifically: performing change processing on the $i^{th}$ group of configuration information of the broadcast synchronization signal when the $i^{th}$ part of system information of the system information changes, where both i and N are positive integers, and i is less than or equal to N.

Optionally, the third system information includes: a synchronization signal parameter, so that the UE receives, according to the synchronization signal parameter, the first synchronization signal matched with the synchronization signal parameter.

Optionally, the configuration information of the first synchronization signal, the configuration information of the second synchronization signal, and/or configuration information of the third synchronization signal include: different synchronize sequences, different shifts of a synchronize sequence, a preset time-frequency position of a synchronize sequence, the different synchronize sequences and the preset time-frequency position of the synchronize sequence, or the different shifts of the synchronize sequence and the preset time-frequency position of the synchronize sequence.

Persons of ordinary skill in the art may understand that all or some of the steps of the method embodiments may be implemented by a program instructing relevant hardware. The program may be stored in a storage medium that can be acquired by a computer. When the program runs, the steps of the method embodiments are performed. The foregoing storage medium includes: any medium that can store program code, such as a ROM, a RAM, a magnetic disk, or an optical disc.

Figure 5:
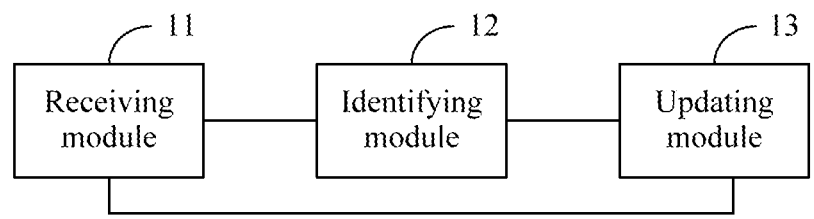
FIG. 5 is a schematic structural diagram of an embodiment of a system information processing apparatus according to the present invention.

FIG. 5 is a schematic structural diagram of an embodiment of a system information processing apparatus according to the present invention. As shown in FIG. 5, the apparatus in this embodiment includes: a receiving module 11, an identifying module 12, and an updating module 13. The receiving module 11 is configured to receive a first synchronization signal. The identifying module 12 is configured to identity whether configuration information of the first synchronization signal is configured as an indication for a system information change. The receiving module 11 is further configured to: if the identifying module 12 identifies that the configuration information of the first synchronization signal is configured as the indication for a system information change, receive broadcast system information. The updating module 13 is configured to update a mapping relationship between a current synchronization signal and the system information according to the first synchronization signal and the received broadcast system information.

The system information processing apparatus in this embodiment may perform the technical solutions in the method embodiment shown in FIG. 1. Implementation principles and technical effects thereof are similar, and details are not described herein again.

Figure 6:
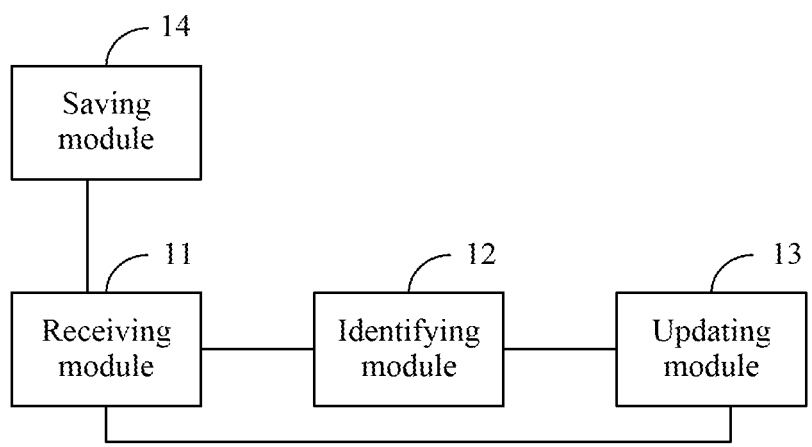
FIG. 6 is a schematic structural diagram of another embodiment of a system information processing apparatus according to the present invention.

FIG. 6 is a schematic structural diagram of another embodiment of a system information processing apparatus according to the present invention. Based on the embodiment shown in FIG. 5, as shown in FIG. 6, the identifying module 12 is specifically configured to compare the configuration information of the first synchronization signal with configuration information of a synchronization signal in the mapping relationship between the current synchronization signal and the system information, and if the configuration information of the first synchronization signal is different from the configuration information of the synchronization signal in the mapping relationship between the current synchronization signal and the system information, the receiving module ii receives broadcast first system information. The updating module 13 is specifically configured to store a mapping relationship between the first synchronization signal and the first system information in the mapping relationship between the synchronization signal and the system information.

Optionally, if the first system information includes a second synchronization signal, and configuration information of the second synchronization signal is configured as an indication that preset broadcast information starts, the receiving module 11 is further configured to acquire the preset broadcast information; and the apparatus further includes: a saving module 14, configured to save the preset broadcast information.

Further, in still another embodiment of the present invention, based on the embodiment shown in FIG. 5, the receiving module 11 is further configured to receive a third synchronization signal; and the apparatus further includes: a saving module 14, configured to save the third synchronization signal. The receiving module 11 is further configured to receive broadcast third system information; and the saving module 14 is further configured to establish the mapping relationship between the current synchronization signal and the system information according to the third synchronization signal and the third system information.

Optionally, when the third synchronization signal includes N groups of configuration information, the third system information includes N parts of system information, and the $i^{th}$ group of configuration information corresponds to the $i^{th}$ part of system information and is used to indicate whether the $i^{th}$ part of system information changes, the identifying module 12 is specifically configured to identify whether the first synchronization signal is configured as an indication for a system information change; and if it is identified that the $i^{th}$ group of configuration information of the first synchronization signal is configured as an indication for a change of the $i^{th}$ part of system information of the first system information, the receiving module 11 receives the $i^{th}$ part of broadcast system information. The updating module 13 is specifically configured to update the first synchronization signal and the first system information in the mapping relationship between the current synchronization signal and the system information according to the $i^{th}$ group of configuration information and the $i^{th}$ part of system information, where both i and N are positive integers, and i is less than or equal to N.

Optionally, the third system information includes a synchronization signal parameter, and the receiving module 11 is specifically configured to receive, according to the synchronization signal parameter, the first synchronization signal matched with the synchronization signal parameter.

Figure 7:
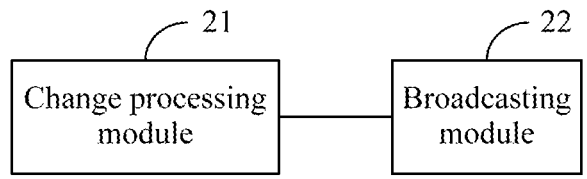
FIG. 7 is a schematic structural diagram of still another embodiment of a system information processing apparatus according to the present invention

FIG. 7 is a schematic structural diagram of still another embodiment of a system information processing apparatus according to the present invention. As shown in FIG. 7, the apparatus in this embodiment includes: a change processing module 21 and a broadcasting module 22. The change processing module 21 is configured to perform change processing on configuration information of a broadcast synchronization signal when system information changes. The broadcasting module 22 is configured to broadcast changed system information and a first synchronization signal generated after the change processing, so that UE identifies, after receiving the first synchronization signal, whether configuration information of the first synchronization signal is configured as an indication for a system information change; and if it is identified that the configuration information of the first synchronization signal is configured as the indication for a system information change, receives the broadcast changed system information, and updates a mapping relationship between a current synchronization signal and the system information according to the first synchronization signal and the broadcast changed system information.

The system information processing apparatus in this embodiment may perform the technical solutions in the method embodiment shown in FIG. 4. Implementation principles and technical effects thereof are similar, and details are not described herein again.

Further, in yet another embodiment of the present invention, based on the embodiment shown in FIG. 7, the broadcasting module 22 is further configured to broadcast the first system information, where the first system information includes a second synchronization signal, and configuration information of the second synchronization signal is configured as an indication that preset broadcast information starts, so that after receiving the broadcast first system information, the UE acquires the preset broadcast information, and saves the preset broadcast information.

Optionally, the broadcasting module 22 is further configured to broadcast a third synchronization signal; and broadcast third system information, so that after receiving the third synchronization signal and the third system information, the UE establishes the mapping relationship between the current synchronization signal and the system information.

Optionally, the apparatus may further include: a grouping module, configured to divide configuration information of a synchronization signal in the mapping relationship between the current synchronization signal and the system information into N groups, and divide system information corresponding to the synchronization signal into N groups, so that the $i^{th}$ group of configuration information corresponds to the $i^{th}$ part of system information and is used to indicate whether the $i^{th}$ part of system information changes. The change processing module 21 is specifically configured to perform change processing on the $i^{th}$ group of configuration information of the broadcast synchronization signal when the $i^{th}$ part of system information of the system information changes, where both i and N are positive integers, and i is less than or equal to N.

Optionally, the third system information broadcast by the broadcasting module 22 includes: a synchronization signal parameter, so that the UE receives, according to the synchronization signal parameter, the first synchronization signal matched with the synchronization signal parameter.

The present invention further provides a communications system, including: user equipment and a network side device, where the user equipment may be the system information processing apparatus shown in FIG. 5 or FIG. 6, and can implement any one of the method embodiments shown in FIG. 1 to FIG. 3, and the network side device may be the system information processing apparatus shown in FIG. 7, and can perform the method embodiment shown in FIG. 4. Implementation principles thereof are similar, and details are not described herein again.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A system information processing method comprising: receiving a first synchronization signal; and identifying whether configuration information of the first synchronization signal is configured as an indication for a system information change; and if it is identified that the configuration information of the first synchronization signal is configured as the indication for a system information change, receiving broadcast system information, and updating a mapping relationship between a current synchronization signal and the system information according to the first synchronization signal and the received broadcast system information.

2. The method according to claim 1, wherein the identifying whether configuration information of the first synchronization signal is configured as an indication for a system information change; and if it is identified that the configuration information of the first synchronization signal is configured as the indication for a system information change, receiving broadcast system information, and updating a mapping relationship between a current synchronization signal and the system information according to the first synchronization signal and the received broadcast system information comprises: comparing the configuration information of the first synchronization signal with configuration information of the synchronization signal in the mapping relationship between the current synchronization signal and the system information; and if the configuration information of the first synchronization signal is different from the configuration information of the synchronization signal in the mapping relationship between the current synchronization signal and the system information, receiving broadcasted first system information and storing a mapping relationship between the first synchronization signal and the first system information in the mapping relationship between the synchronization signal and the system information.

3. The method according to claim 2, wherein the method comprises: if the first system information comprises a second synchronization signal, and configuration information of the second synchronization signal is configured as an indication that preset broadcast information starts, acquiring the preset broadcast information, and saving the preset broadcast information.

4. The method according to claim 1, wherein before the receiving a first synchronization signal, the method further comprises: receiving and saving a third synchronization signal; and receiving broadcast third system information, and establishing the mapping relationship between the current synchronization signal and the system information according to the third synchronization signal and the third system information.

5. The method according to claim 4, wherein the third synchronization signal comprises N groups of configuration information, the third system information comprises N parts of system information, and a $i^{th}$ group of configuration information corresponds to a $i^{th}$ part of system information and is used to indicate whether the $i^{th}$ part of system information changes, wherein both i and N are positive integers, and i is less than or equal to N.

6. A system information processing method comprising: performing change processing on configuration information of a broadcast synchronization signal when system information changes; and broadcasting a first system information and a first synchronization signal generated after the change processing to UE for identifying, after receiving the first synchronization signal, whether configuration information of the first synchronization signal is configured as an indication for the system information change; and if it is identified that the configuration information of the first synchronization signal is configured as the indication for the system information change, receiving the broadcast changed system information, and updating a mapping relationship between a current synchronization signal and the system information according to the first synchronization signal and the broadcast changed system information.

7. The method according to claim 6, wherein the first system information comprises a second synchronization signal, and configuration information of the second synchronization signal is configured as an indication that preset broadcast information starts, so that after receiving the broadcast first system information, the UE acquires the preset broadcast information, and saves the preset broadcast information.

8. The method according to claim 7, further comprising: broadcasting a third synchronization signal; and broadcasting third system information, so that after receiving the third synchronization signal and the third system information, the UE establishes the mapping relationship between the current synchronization signal and the system information.

9. The method according to claim 8, further comprising: dividing configuration information of a synchronization signal in the mapping relationship between the current synchronization signal and the system information into N groups, and dividing system information corresponding to the synchronization signal into N groups, so that a $i^{th}$ group of configuration information corresponds to a $i^{th}$ part of system information and is used to indicate whether the $i^{th}$ part of system information changes; wherein the performing change processing on configuration information of a broadcast synchronization signal when system information changes comprises: performing change processing on the $i^{th}$ group of configuration information of the broadcast synchronization signal when the $i^{th}$ part of system information of the system information changes, wherein both i and N are positive integers, and i is less than or equal to N.

10. The method according to claim 8, wherein the third system information comprises: a synchronization signal parameter, so that the UE receives, according to the synchronization signal parameter, the first synchronization signal matched with the synchronization signal parameter.

11. The method according to claim 8, wherein the configuration information of the first synchronization signal, the configuration information of the second synchronization signal, and/or configuration information of the third synchronization signal comprise: different synchronize sequences, different shifts of a synchronize sequence, a preset time-frequency position of a synchronize sequence, the different synchronize sequences and the preset time-frequency position of the synchronize sequence, or the different shifts of the synchronize sequence and the preset time-frequency position of the synchronize sequence.

12. A system information processing apparatus, comprising: a receiver, configured to receive a first synchronization signal; a processor, configured to identity whether configuration information of the first synchronization signal is configured as an indication for a system information change; the receiver is further configured to receive a broadcasted system information if the processor identifies that the configuration information of the first synchronization signal is configured as the indication for a system information change; and the processor, configured to update a mapping relationship between a current synchronization signal and the system information according to the first synchronization signal and the received broadcasted system information.

13. The apparatus according to claim 12, wherein the processor is specifically configured to compare the configuration information of the first synchronization signal with configuration information of a synchronization signal in the mapping relationship between the current synchronization signal and the system information; the receiver is specifically configured to receive broadcasted first system information, when the configuration information of the first synchronization signal is different from the configuration information of the synchronization signal in the mapping relationship between the current synchronization signal and the system information; and the processor is specifically configured to store a mapping relationship between the first synchronization signal and the first system information in the mapping relationship between the synchronization signal and the system information.

14. The apparatus according to claim 13, wherein the receiver is further configured to acquire a preset broadcast information, if the first system information comprises a second synchronization signal, and configuration information of the second synchronization signal is configured as an indication that preset broadcast information starts; and the processor, configured to save the preset broadcast information.

15. The apparatus according to claim 12, wherein the receiver is further configured to receive a third synchronization signal; the processor, configured to save the third synchronization signal; the receiver is further configured to receive broadcast third system information; and the processor is further configured to establish the mapping relationship between the current synchronization signal and the system information according to the third synchronization signal and the third system information.

16. The apparatus according to claim 15, wherein the processor is specifically configured to identify whether the configuration information of the first synchronization signal is configured as an indication for a system information change, when the third synchronization signal comprises N groups of configuration information, the third system information comprises N parts of system information, and a $i^{th}$ group of configuration information corresponds to a $i^{th}$ part of system information and is used to indicate whether the $i^{th}$ part of system information changes; and the receiver is specifically configured to receive an $i^{th}$ part of the broadcasted system information, if it is identified that the $i^{th}$ group of configuration information of the first synchronization signal is configured as an indication for a change of the $i^{th}$ part of system information; and the processor is specifically configured to update the first synchronization signal and the first system information in the mapping relationship between the current synchronization signal and the system information according to the $i^{th}$ group of configuration information and the $i^{th}$ part of system information; and wherein both i and N are positive integers, and i is less than or equal to N.

17. A system information processing apparatus, comprising: a processor, configured to perform change processing on configuration information of a broadcast synchronization signal when system information changes; and a transmitter, configured to broadcast a first system information and a first synchronization signal generated after the change processing, for UE identifying, after receiving the first synchronization signal, whether configuration information of the first synchronization signal is configured as an indication for the first system information change.

18. The apparatus according to claim 17, wherein the transmitter is further configured to broadcast the first system information for UE acquiring a preset broadcast information, and saving the preset broadcast information, wherein the first system information comprises a second synchronization signal, and configuration information of the second synchronization signal is configured as an indication that preset broadcast information starts.

19. The apparatus according to claim 17, wherein the transmitter is further configured to broadcast a third synchronization signal; and broadcast third system information for UE establishing a mapping relationship between a current synchronization signal and the system information, after receiving the third synchronization signal and the third system information.

* * * * *